United States Patent [19]

Masuo

[11] 4,095,738
[45] Jun. 20, 1978

[54] ELECTRONIC CASH REGISTER WITH MEANS FOR CORRECTING ERRONEOUSLY PRINTED DATA

[75] Inventor: Tetsuya Masuo, Shizuoka, Japan

[73] Assignee: Tokyo Electric Co., Ltd., Tokyo, Japan

[21] Appl. No.: 740,484

[22] Filed: Nov. 10, 1976

[30] Foreign Application Priority Data

Nov. 14, 1975 Japan ............................... 50-137014

[51] Int. Cl.$^2$ ..................... G06F 11/00; G07G 5/00
[52] U.S. Cl. ................................. 235/309; 235/3; 235/433; 364/405
[58] Field of Search ...... 235/153 AS, 153 B, 153 BK, 235/156, 61.9 R, 61.9 A, 58 P, 2, 3, 7 R, 309; 364/900, 405

[56] References Cited

U.S. PATENT DOCUMENTS

| | | | |
|---|---|---|---|
| 3,105,636 | 10/1963 | Greene | 340/146.1 AJ |
| 3,186,636 | 6/1965 | Hoffman et al. | 235/3 |
| 3,541,526 | 11/1970 | Levy et al. | 364/900 |
| 3,899,775 | 8/1975 | Larsen | 364/900 |
| 4,003,030 | 1/1977 | Takagi et al. | 364/900 |

Primary Examiner—Charles E. Atkinson
Attorney, Agent, or Firm—Flynn & Frishauf

[57] ABSTRACT

An electronic cash register comprises a keyboard having a data input key and a void key, a central processor unit coupled to the keyboard and a read only memory coupled to the central processor unit, the read only memory having a program stored therein. A memory means is coupled to the central processor unit and includes a printing data memory for storing an input data item supplied from the data input key and the total of a plurality of the input data items. Further provided is a printing means which includes a buffer register, a printer driver and a printer for printing the plurality of input data items and the total thereof successively on a recording paper. The printing driver includes means for feeding the recording paper by one row for printing a new data item when the new data item is supplied to the buffer register, and an inhibiting means for inhibiting the one row feeding of the recording paper when the void key is depressed and for printing a correcting symbol directly on a data item printed on the paper before the new data item is supplied to the buffer register.

3 Claims, 7 Drawing Figures

F I G. 5B
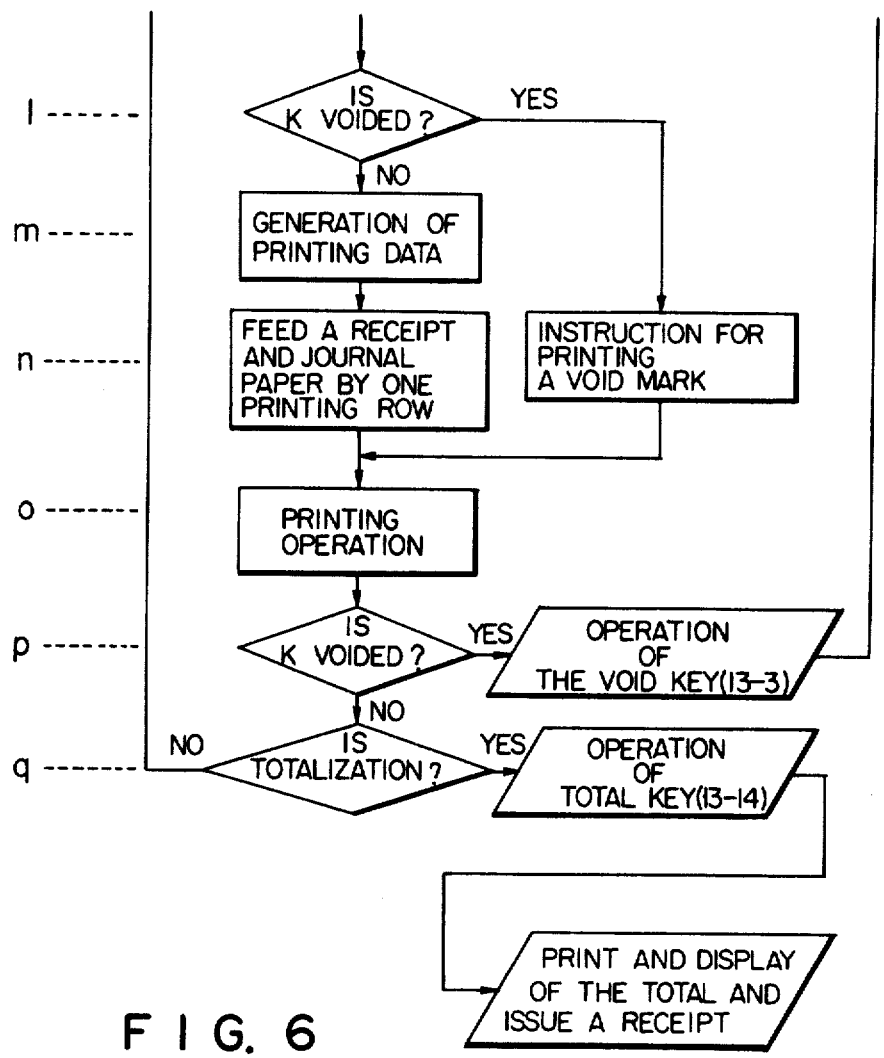
F I G. 6
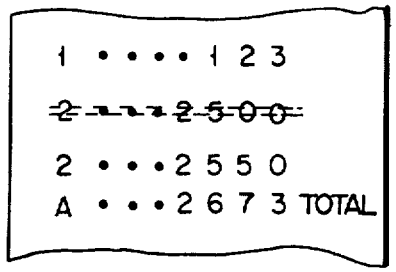

ELECTRONIC CASH REGISTER WITH MEANS FOR CORRECTING ERRONEOUSLY PRINTED DATA

The present invention relates generally to an electronic cash register and, more particularly, to the one with a correcting means for correcting the input data already printed on a recording paper.

The electronic cash register has a function that the data corresponding to individual goods sold is inputted and these data and the total of them are successively printed on a receipt and a journal paper (hereinafter both will be referred to as a recording paper). An operator of the cash register frequently enters erroneous data into the cash register. When erroneous data is entered, the erroneous data must be corrected after that data have been printed on the recording paper. In the conventional cash register, such erroneous data printed (also referred to as an erroneously registered input data) is corrected in the following manner. When the data "2 ... 2500" is erroneously printed on the second row of the recording paper, as shown in FIG. 1, the identical data is printed on the third row and a character, for example, "VOID", is printed on the right side of the data newly printed, and a correct data, e.g. "2 ... 2550" is printed on the fourth row of the recording paper. The printing of the data and the total of them are printed on both the receipt to be handed to a customer and the journal paper so that the above-mentioned correction print is also made on both the papers. When the customer checks such printed receipt, he frequently thinks the calculation was erroneous, failing to notice the "VOID", thereby tending to create an unfavorable feeling between the customer and the cash register operator. Further, when the responsible person of the shop checks the contents of the journal paper in order to check the sales, he confirms the data accompanied by the "VOID" and manually erases the data just above the data confirmed. This is superfluous in the checking work. The reason why such a defective correcting method must be used is that the conventional cash register feeds the recording paper by one row immediately after a first input data item is printed for preparing the printing of a second incoming data item.

Accordingly, an object of the present invention is to provide an electronic cash register in which the erroneous data is not printed on two rows on the recording paper and a correcting symbol is printed on the position where the erroneous data is printed.

SUMMARY OF THE INVENTION

According to the present invention, an electronic cash register comprises a keyboard including a data input key and a void key; a central processor unit coupled to the keyboard; a read only memory coupled to the central processor unit and storing a program therein; a memory means coupled to the central processor unit and including a printing data memory which stores an input data item supplied from the input data key and the total of a plurality of the input data items; and printing means including a buffer register coupled to the memory means, a printer driver coupled to the buffer register and to the central processor unit, and a printer coupled to the printer driver for printing the plurality of input data items and the total thereof successively on a recording paper. The printer driver of the printer means comprises a feeding means for feeding the recording paper by one row for printing a new data item when the new data item is supplied to the buffer register from the printing data memory; and an inhibiting means for inhibiting the one row feeding of the recording paper when the void key is depressed and for printing a correcting symbol directly on the data item printed on the recording paper before the new data item is supplied to the buffer register.

BRIEF DESCRIPTION OF THE DRAWINGS

Other objects and features of the present invention will be apparent from the following description taken in connection with the accompanying drawings, in which:

FIGS. 5A and 5B are combined to form a flow chart of the registering operation in the circuit of FIG. 4; and FIG. 6 shows an example of the correcting mode of the erroneous data printed by the apparatus of FIG. 2.

DETAILED DESCRIPTION

Figure 1:
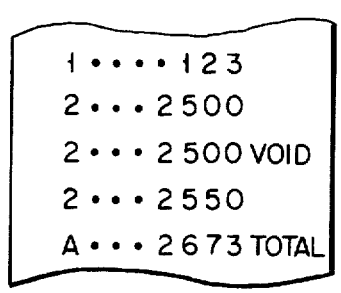
FIG. 1 is a part of printed data on a recording paper with data erroneously printed and corrected by a conventional cash register.
Figure 2:
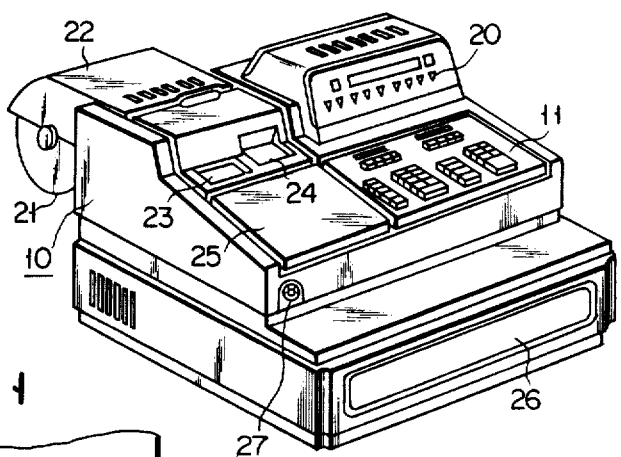
FIG. 2 illustrates the external appearance of an electronic cash register according to an embodiment of the present invention.
Figure 3:
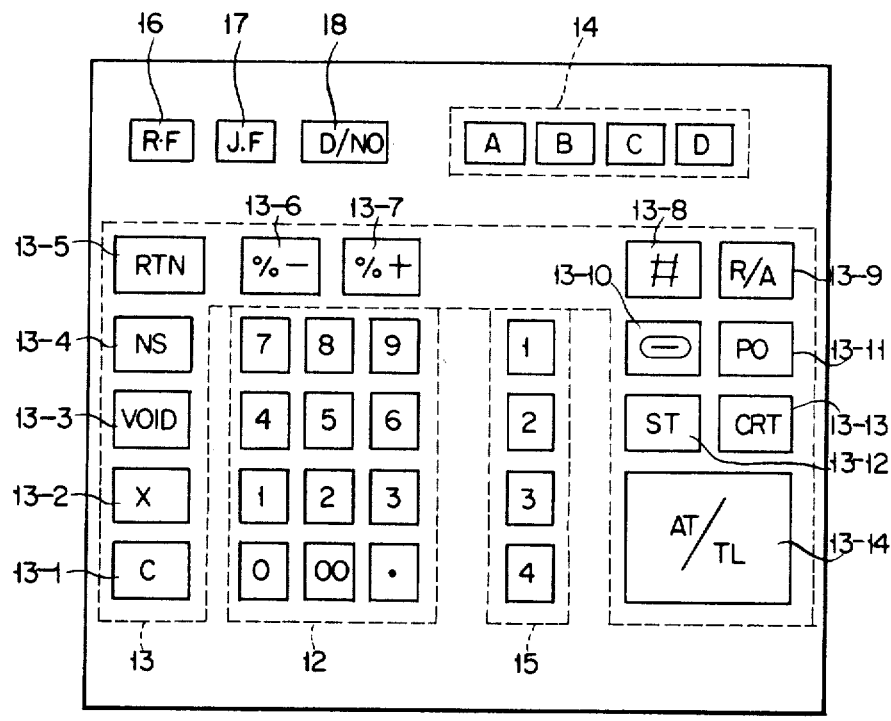
FIG. 3 is one form of keyboard of the apparatus of FIG. 2.
Figure 4:
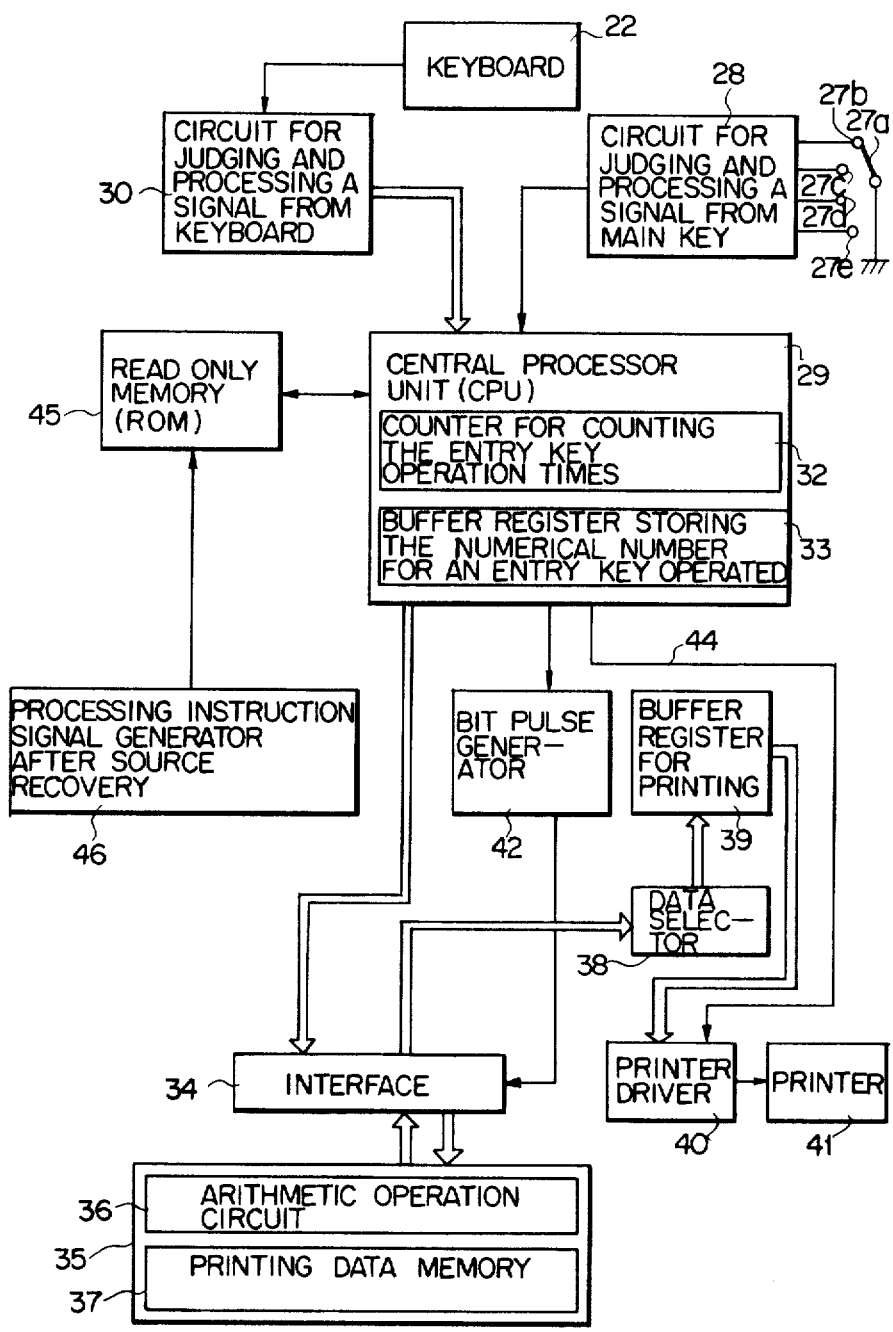
FIG. 4 is a block diagram of a major part of the circuit of the cash register shown in FIG. 2.

In FIG. 2, a casing 10 includes an electronic circuit shown in FIG. 4 therein. A keyboard 11 on the front surface of the casing 10 is provided with various kinds of keys as shown in FIG. 3. Namely, the keyboard 11 includes a group 12 of entry keys for entering an amount of money, an amount of goods, or the like to be registered; a group 13 of function keys for performing addition, subtraction, multiplication or the like of the input data; a group 14 of clerk keys designated by characters A, B, C and D, for example, indicating respective operators of the cash registers; a group 15 of department keys for designating the respective sales departments by using numerals 1, 2, ... 4, for example; a receipt paper feed key (RF) 16 for feeding a receipt paper without interlocking with the printing operation of input data; a journal paper feed key (J.F) 17 for feeding a journal paper without interlocking with the printing operation of the input data; and a double function key (D/NO) 18 for setting a date and a register number into a memory means 35 shown in FIG. 4. The entry key group 12 includes keys designated by ".", "00" to "9". The function key group 13 includes a clear key "C" (13-1), a multiplication key "X" (13-2), a void key "VOID" (13-3), a no-sale key "NS" (13-4), a return merchandise key "RTN" (13-5), percentage keys "%" (13-6) and "%+" (13-7), a number key "#" (13-8), a received on account key "R/A" (13-9), a subtract key "⊖" (13-10), a paid out key "PO" (13-11), a subtotal key "ST" (13-12), a credit sales total key "CRT" (13-13) and a double function key "AT/TL" (13-14) having both the functions of an amount tendered key "AT" and a cash total key "TL". The casing 10 is further provided with a display portion 20 for displaying, for example, subtotal (ST), total (TL), register number, void or the like, a roll loader 22 for loading a feeding roll 21 of receipt and journal paper, a receipt issuing port 23, an inspection window for inspecting the contents recorded on the journal paper, a memorandum holder 25 for holding memo sheets or the like by using a magnet, a cash box 26 and a main key switch 27.

The main key switch 27 is keyed by an operator or a responsible person to issue an instruction for executing various works such as "register", "inspection", or "liqudation" to a central processor unit (CPU) 29 to be described later. In this specification, the term "register" means the task in which the data representing the amount of money of goods or the like are loaded into the memory means 35, those data are totalized and the data and the total are printed on the receipt and the journal paper. The term "inspection" means the task that individual data stored in the memory means 35, the total amount of sales, the total number of goods sold, or the like are printed onto the journal paper for inspection. The term "liqudation" is used to mean the task that, when the business for the day is over, the total amount of money, the total number of goods sold or the like stored in the memory means 35 of the cash register are printed on the journal paper through the "register" work and the contents of the memory means 35 is cleared. As shown in FIG. 4, a movable contact 27a of the main key switch 27 is rotated to contact stationary contacts 27b to 27e. When the contact 27b is closed, the cash register is in "OFF" condition. When the contact 27c is closed, the cash register engages in "register" work. The "inspection" work is executed when the contact 27d is closed. The "liqudation" work is performed under the closed condition of the contact 27e. The close of the contact 27c of the "register" terminal causes a judgement/processing circuit 28 to transmit to the central processor unit (CPU) 29 a signal for instructing the operation necessary for the "register" work. That is, the judgement/processing circuit 28 judges and processes a signal from the main key 27. Then, if an operator performs operations necessary for "register" work on the keyboard 11, for example, pushing down entry keys 12, the clerk key 14, and the department key 15, another judgement/processing circuit 30 for judging and processing a signal fed from the keyboard 22 transmits the contents defined by the operations of those keys to the CPU 29.

The central processing unit 29 causes a counter 32 to count the number of key operations. For example, if one of the entry keys 12 is pushed three times, the number of the key operations, i.e. the digit number, is counted by the counter.

When the counter 32 counts "1", i.e. one of the entry keys 12 is first operated, the CPU 29 clears a buffer register 33 and causes to store the value of the first operated key in a buffer register 33. Similarly, the value of a second operated key 12 will successively be stored in the buffer register 33 and so on. In this manner, a set of data representing the amount of money, for example, are stored in the buffer register 33. Under this condition, if the department key to which that data belongs (one of the department keys 15) is pressed down, the CPU 29 compells the data in the buffer register 33 to enter the memory means 35 by way of an interface 34, and clears the counter 32. The memory means 35 includes an arithmetic operation circuit 36 and a printing data memory 37. In the arithmetic operation circuit 36, an additionally entered data to be registered (the content of the buffer register 33) is added to the total data previously stored in the printing data memory 37, and the result of the addition is again written into the printing data memory 37. Individual data stored in the printing data memory 37 and the total are read out of the printing data memory 37 to be written in a print buffer register 39 via a data selector 38. The data written in the printing buffer register 39 are printed on the receipt paper and the journal paper by means of a printer 41 which is driven by a printer driver 40 under the control of the CPU 29. A bit pulse generator 42 generates a series of bit pulses which in turn are fed to the interface 34. The bit pulses are used to properly time the writing operation of incoming data into the printing data memory 37. The print buffer register 39, the printer driver 40 and the printer 41 are combined to constitute a printer mechanism. The printer mechanism further includes a paper feeding mechanism for the recording paper. In the operation of the printer mechanism, data is fed to the print buffer register 39 and when the CPU 29 issues a feed instruction to the feed mechanism through control line 44, the receipt and the journal paper are shifted by one row and then the data from the buffer register 39 are printed on the papers. After completion of this printing, the receipt and the journal paper are not fed until new data to be subsequently printed is stored in the print buffer register 39. More precisely, the recording paper is moved by one row for the purpose of printing the ensuing or the second data, not immediately after the first data printing completes but just before the second data is printed. Such a paper feeding operation is executed under the control of program stored in a read only memory (ROM) 45 in cooperation with the CPU 29. A repeat of the printing operation successively records the data to be registered on the recording paper.

The description to follow is the method for correcting the erroneously registered data when erroneous data is registered, or erroneous data is printed. The correction in such a case is made by pushing the void key 13-3 of the function key group 13. In response to the void key operation, the CPU 29 transfers through the interface 34 to the memory means 35 the data, for example, "2500" to be corrected, temporarily stored in the buffer register 33, and recorded on the second row, as shown in FIG. 6, while at the same time the CPU 29 issues to the printing driver 40 an instruction to print a correcting symbol. Upon receipt of the data to be corrected, the memory means 35 operates in such a way that, through the operation of the arithmetic operation circuit 36, the data "2500" fed from the buffer register 33 is subtracted from the data previously stored in the printing data memory 37, for example, "123 + 2500 = 2623" shown in FIG. 6, and the resultant data "123" of the subtraction is written again into the printing data memory 37.

On the other hand, the printer driver 40 inhibits the one row feeding of the receipt and the journal paper (no feeding instruction is issued from the CPU 29), and drives the printer 41 in order that the correcting symbol, for example "===" is printed on the data to be corrected, for example, "2 . . . 2500" shown in FIG. 6. It is to be noted that the correcting symbol is not restricted to the just-mentioned one. For example, asterisks, crosses or dots may be employed in place of that of this example.

Further, any suitable type of correcting symbol may be printed on the side of the data to be corrected. At power supply failure, means is provided not to destroy various data stored in the memory means 35. After source recovery, the instruction from a processing instruction signal generator after source recovery 46 controls the ROM 45 so that the cash register can be operated normally.

Figure 5A:
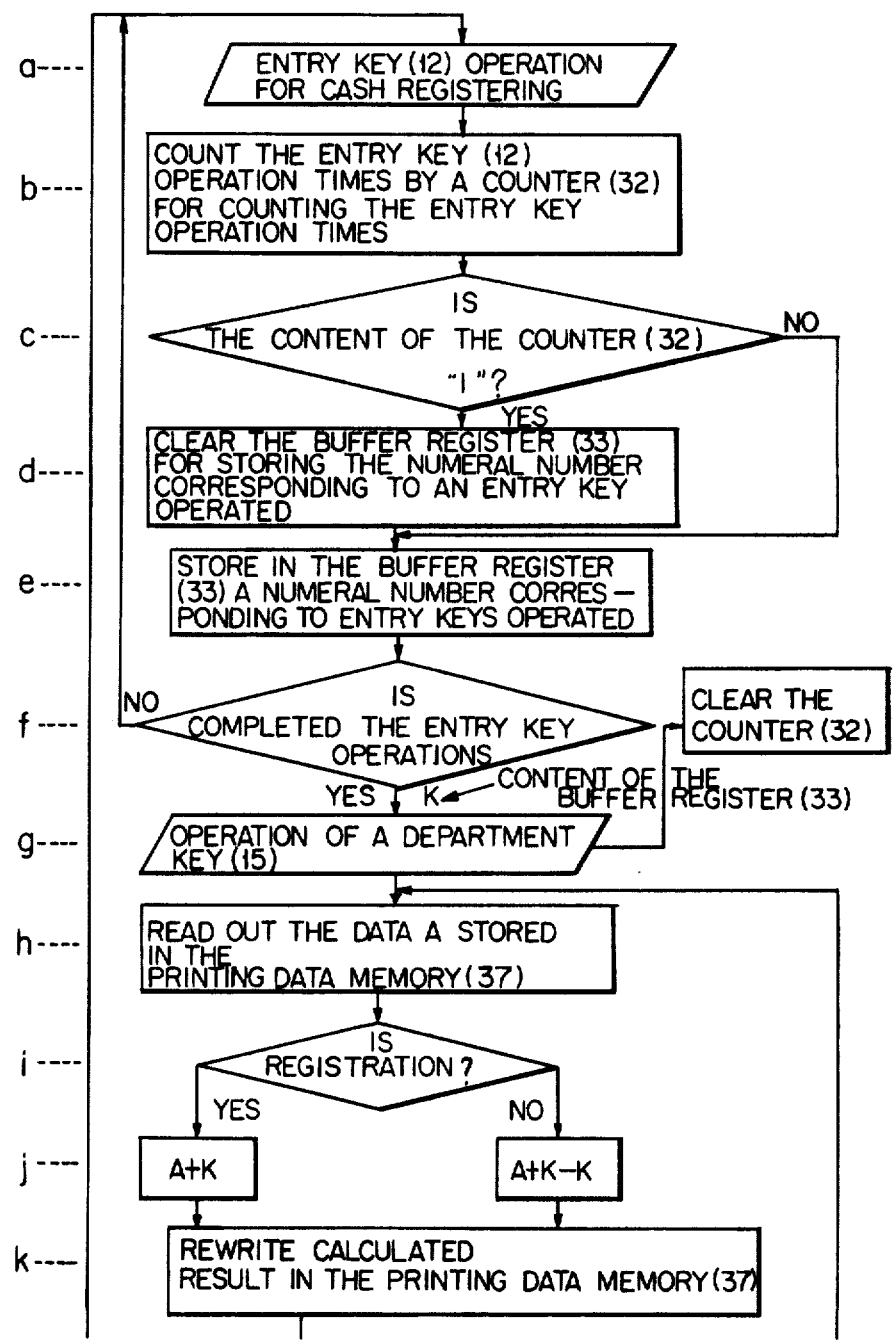

Following the explanation of the electronic cash register according to the present invention, the registering operation thereof will be given with reference to FIG. 5. (a) The entry key 12 is operated to enter the amount of money to be registered. (b) The counter 32 counts the times of entry key operations or the digit number of the input data. (c) When the counter 32 stores "1", (d) the buffer register 33 is cleared and (e) the input data is stored in the buffer register 33. (f) When the entry key operations are completed, (g) one of the department key groups 15 is operated thereby to clear the counter 32. (h) The data A in the printing data memory 37 is read out. (i) Decision is made if the input data K is to be registered or not. (j) When the data K is to be registered, the sum of "A + K" is calculated, and when a decision is made that the data K is erroneously registered or the void key 13-3 is operated as will be described later, the calculation of "A + K − K" is performed. (k) The calculation result is again written into the printing data memory 37. (l) Decision is made whether the input data K is to be corrected or not. If it must be corrected, a correction operation produces the instruction for printing correcting symbol and at the same time the one row feeding of the recording paper is inhibited (i.e. the feed instruction is not applied to the printer driver 40). When no correction is needed, (m) the printing data is generated and (n) the recording paper is fed by one row and (o) the data K is printed on the recording paper shifted by one row. In the case of correction, the correction symbol is printed on the position where the data K is printed. (p) Whether or not the data K is to be corrected is checked, if correction is necessary, the void key is operated to transfer the correcting instruction to the input of the step (h), and if no correction is needed, (q) whether or not totalization is necessary, if it is needed, the total key 13-14 is operated to record it on the receipt, while if totalization is not necessary, a correct data must be reentered in the step (a).

What is claimed is:

1. An electronic cash register comprising:
   a keyboard including a data input key and a void key;
   a central processor unit coupled to said keyboard;
   a read only memory coupled to said central processor unit and storing a program therein;
   a memory means coupled to said central processor unit and including a printing data memory which stores an input data item supplied from said data input key and the total of a plurality of said input data items; and
   printing means including a buffer register coupled to said memory means, a printer driver coupled to said buffer register and to said central processor unit, and a printer coupled to said printer driver which prints said plurality of input data items and the total thereof successively on a recording paper;
   said printer driver including: a feeding means for feeding said recording paper by one row for printing a new data item when said new data item is supplied to said buffer register from said printing data memory; and an inhibiting means for inhibiting said one row feeding of said recording paper when said void key is depressed and for printing a correcting symbol directly on a data item printed on said recording paper before said new data item is supplied to said buffer register.

2. An electronic cash register according to claim 1, comprising an interface coupled between said memory means and said central processor unit.

3. An electronic cash register according to claim 1, comprising an interface and a data selector coupled between said buffer register and said memory means.

* * * * *